United States Patent [19]
Aaltonen et al.

[11] Patent Number: 5,587,077
[45] Date of Patent: Dec. 24, 1996

[54] SCREEN CYLINDER OR PLATE HAVING A GROOVED FIRST FACE AND A STEPLESS SECOND FACE

[75] Inventors: Frank Aaltonen, Lisse, Netherlands; Timo Alajaaski, Kotka, Finland

[73] Assignee: CAE Investments B.V., Eygelshoven, Netherlands

[21] Appl. No.: 211,403

[22] PCT Filed: Sep. 30, 1992

[86] PCT No.: PCT/FI92/00263

§ 371 Date: Jul. 18, 1994

§ 102(e) Date: Jul. 18, 1994

[87] PCT Pub. No.: WO93/07384

PCT Pub. Date: Apr. 15, 1993

[30] Foreign Application Priority Data

Oct. 4, 1991 [FI] Finland .................................. 914703

[51] Int. Cl.$^6$ .................................................... B01D 39/10
[52] U.S. Cl. ........................ 210/498; 210/499; 29/896.6; 29/896.62
[58] Field of Search ................................ 29/163.5, 163.6, 29/163.8, 896.6, 896.62; 210/498, 499

[56] References Cited

U.S. PATENT DOCUMENTS

| | | |
|---|---|---|
| 239,837 | 4/1881 | Pinder et al. . |
| 1,916,393 | 7/1933 | Smith . |
| 1,940,952 | 12/1933 | Hutchens . |
| 3,277,824 | 10/1966 | Malm et al. . |
| 3,664,502 | 5/1972 | Nichols, Jr. . |
| 3,748,428 | 7/1973 | Nichols, Jr. . |
| 4,529,520 | 7/1985 | Lampenius . |
| 4,676,903 | 6/1987 | Lampenius et al. . |
| 4,776,957 | 10/1988 | Lampenius et al. . |
| 4,795,560 | 1/1989 | Chupka et al. . |
| 4,880,540 | 11/1989 | Frejborg . |
| 4,885,090 | 12/1989 | Chupka et al. . |
| 4,901,417 | 2/1990 | Chupka et al. . |
| 4,950,402 | 8/1990 | Frejborg . |
| 5,064,537 | 11/1991 | Chupka et al. . |
| 5,073,254 | 12/1991 | Beisenherz et al. . |
| 5,147,543 | 9/1992 | Frejborg . |

FOREIGN PATENT DOCUMENTS

| | | |
|---|---|---|
| 465610 | 10/1991 | Sweden . |
| WO82/02345 | 7/1982 | WIPO . |

*Primary Examiner*—W. L. Walker
*Attorney, Agent, or Firm*—Nixon & Vanderhye P.C.

[57] ABSTRACT

The invention relates to a method of manufacturing a screen product and to a screen product manufactured according to the method. In particular, the invention relates to the manufacture of a screen or a filter plate or a cylinder by a new machining method by which a product receives flow properties substantially better than the ones of the prior art devices. It is characteristic of the invention that an aperture having curved wall surfaces is machined in one work phase in the plate in the depth direction. It is characteristic of the screen product of the invention that the screening aperture is progressively widened in the direction of the flow through the plate, and preferably inclined under the ridge adjacent the groove in a plate.

30 Claims, 8 Drawing Sheets

FIG. 5a  FIG. 5b  FIG. 5c
FIG. 5d  FIG. 5e  FIG. 5f
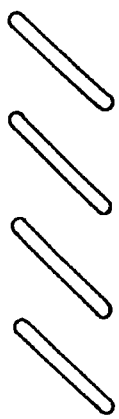
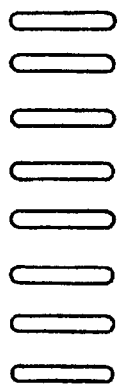
FIG. 5g  FIG. 5h

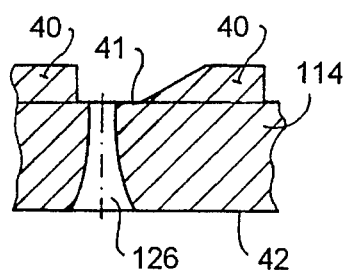 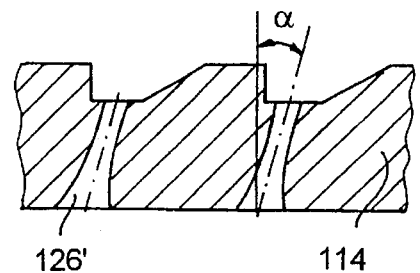
FIG. 6a   FIG. 6b
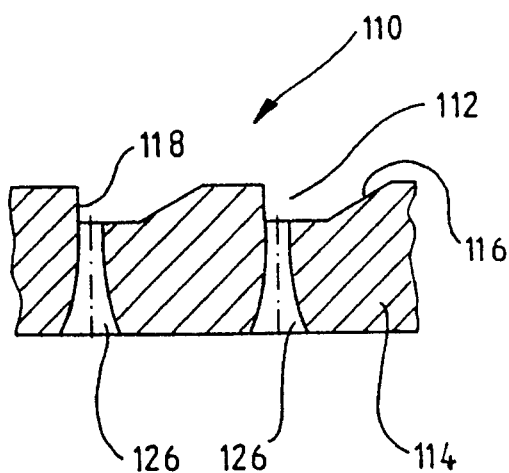 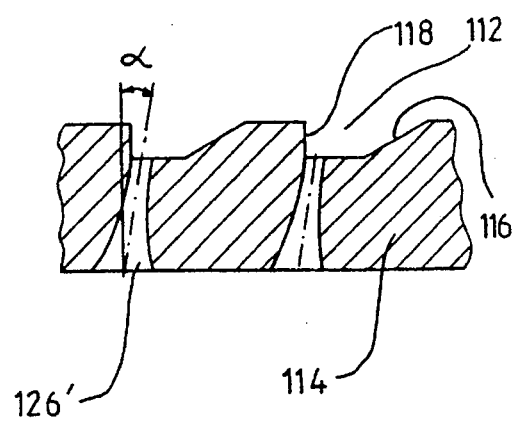
FIG. 7a   FIG. 7b

SCREEN CYLINDER OR PLATE HAVING A GROOVED FIRST FACE AND A STEPLESS SECOND FACE

BACKGROUND AND SUMMARY OF THE INVENTION

The present invention relates to a method of manufacturing a screen product, and to a screen product manufactured according to the method. The invention relates in particular to manufacturing a screen or a filter plate or a drum by a new machining method by which a product is produced the flow properties of which are remarkably better than the ones of prior art apparatus. The screen plate or cylinder of the invention is especially well applicable in the screens, filters, thickeners, washers, etc. used in the wood processing industry, but of course it can be applied also in sorting and thickening purposes in any other industry.

There are known several different prior art methods of manufacturing the screen products mentioned above. Some of the oldest and still used methods are drilling to produce round holes, punching to form apertures of the desired configuration, and milling to produce narrow slots. U.S. Pat. Nos. 239,837, 1,467,758, and 1,928,216 may be mentioned as examples of the above methods of manufacturing a screen plate. The mechanical machining methods mentioned above have for a relatively long time been the only applicable methods even though they have their drawbacks. Punching is usually out of the question when producing screen plates for the wood processing industry because the slot size required in the screens is so small that punching does not produce it without difficulty. Drilling can produce holes which are just about small enough. Drilling small holes is effectively limited by the tendency of the drills to break. Therefore, when a plate is manufactured by drilling, it is necessary either to mill or drill a larger opening in the plate into which opening the relatively small apertures produced by drilling open. This procedure reduces the tendency of the drills to break. However, the drawbacks of the increased number of work phases and the burrs or fins left in the edge of the aperture machined last, which is typical of mechanical machining methods, still remain. The fibers of the fibre suspension are easily caught by these burrs which gradually causes clogging of the screen. It is often very difficult to remove the burrs because they in most cases are located at the bottom of very narrow grooves or apertures the diameter of which is very small.

The same problems are met with also in screen products made by milling where the burrs remain at the bottom of the so-called back grooves. Because of the strength requirements of the product the back grooves cannot be made much wider than the slots extending through the plate. In most cases there is one screening slot per one back groove. This results also in that the open surface of the plate is limited mostly by the size of the neck surfaces required for the strength reasons between the back grooves both in the lateral and in the longitudinal direction of the grooves. Further, in the slots, more precisely in the side surfaces of the slots made by machining there are, of course, because of the machining method, small ridges almost parallel with the longitudinal direction of the slot which remarkably impair the flow through the plate. It is very difficult to eliminate this kind of factors affecting the quality of the surface and the capacity of the screen. This is, however, tried by finishing the plate after the machining, the purpose of the finishing being to remove a thin surface layer from all over the plate, both from the surface of the plate and from the apertures.

However, it has been proved that this kind of finishing is not adequate to remove the burrs, but the screen plate industry all over the world is continuously looking for new methods of removing the burrs from the bottom of the narrow grooves. Further, the finishing unavoidably results in an increase in the size of the apertures in the plate which cannot always be taken into account in advance when the plate is originally being machined. The sizes of the apertures in the screen and sieve plates usable in the pulp industry are the smallest and only just about attainable by the mechanical machining method and they should not be enlarged from that size. This means that the machining blades used must continuously be in a very good condition so that the quality of the machined surfaces they produce is as good as possible. This results in increased maintenance costs of the machining devices and the manufacturing costs of the screen products increase correspondingly.

When considering a functionally optimal plate, the manufacture of the PROFILE™ screen plate developed by A. Ahlstrom Corporation and protected by for example U.S. Pat. No. 4,529,520 may be considered as one of the technically most difficult and non-economical machining object which requires locating the screening aperture either exactly at the root of the ridge in the plate or a little outward from the root of the ridge. Both drills and milling blades are very easily destroyed if the aperture is machined quite at the root of the ridge.

It is typical of both the machining methods discussed above that the diameter/width of the produced aperture is the same until the back opening/groove which in turn is connected to the aperture via a clear shoulder. As an example, a slot of 0.20 mm connected to a back groove of 1–2 mm may be mentioned. Thus the result is by no means a rheologically efficient flow passage. Further, it should be noted that, in the treatment of waste paper pulp, the corner between the back groove and the aperture/slot gathers waxes, adhesives and other sticky substances which first fill the corner and gradually the whole back groove. When studying prior art plates it has been shown that the accumulation of the sticky substances does not by any means stop when the corner is filled up to the aperture/slot but continues uninterrupted until the whole slot is clogged at the back.

European patent application EP 0 414 119 A1 dicloses a screen drum made of a screen plate having grooves on the inlet side of the screen drum. Apertures opening into the grooves are machined through the plate material. The apertures show a two step design, having a small diameter portion opening into the grooves and a larger diameter portion opening into the outlet side of the screen drum. Clearly at least two machining steps are needed to make the apertures, one step for machining a rather large diameter slot or bore on the outlet side of the plate and another step for machining, drilling, the small diameter screening aperture connecting the groove with the large diameter slot or bore. A shoulder is formed in the junction between the two portions. This screen drum and its manufacture are afflicted with the same drawbacks as mentioned earlier for screens having separate backgrooves machined therein. Laser cutting is worth mentioning as a more modern and somewhat more advanced manufacturing method which can be used in machining both apertures and slots. As is known, a laser beam melts material with the result that the walls of apertures manufactured by machining with a laser are hardened and also the material surrounding the apertures is subjected at least to a certain degree to a heat treatment which causes deformation of the surface which results in an increase in the flow resistance caused by the surface. An aperture made by a laser is practically speaking direct, only very minimal tapering is to be seen, the aperture opening in the direction of the beam, and the angle of taper being only 0°–2°. Further, it is typical of an aperture manufactured by a laser that the attainable minimum width/diameter of the aperture is directly proportional to the thickness of the plate. For example the narrowest slot attainable in a 6 mm thick plate, which is generally used in screen plates, is approx. 0.35–0.4 mm which is too large for most screening and thickening purposes. In order to have the flow resistance and the size of the aperture within an applicable and acceptable range the back groove manufactured by milling or drilling is still required to reduce the thickness of the plate to a be suitable for the laser cutting. Thus, as many work phases are still needed as by the conventional milling/drilling method mentioned above. The use of laser also produces burrs in the edge of the aperture which are almost as detrimental as the burrs in milled plates. The burrs should be removed from the edge of the aperture but it is difficult as the burrs are composed of a re-solidified material the removal of which is more difficult than the removal of the burrs produced by milling. Economical use of laser equipment is limited by the fact that only one cutting beam can be used at a time. Further, the maintenance costs of laser equipment are high.

Laser cutting further has the drawback of very strong local heat input in the workpiece which creates an internal stress peak in the material at the end of the slot cut. This residual stress has resulted in breaking of screen drums manufactured by this method, particularly of screens used in conditions of strong fluctuations in the dynamic load.

International patent application WO 82/02345 discloses a screen plate, in the construction of which the problems caused by milled back grooves have been taken into account. It is a characteristic feature of the embodiment of the publication that the thickening slot ends at the filtrate space side in a duct opening in the configuration of a V or in a duct having even curved walls. However, the publication does not describe the manufacturing method at all. It is obvious that during the time of the patent application, the problem of the back grooves was recognized and a solution was sought to it. A solution was found but no industrially applicable manufacturing method. When thinking about the manufacture of the plate in question the result is that, in order to have a functionally efficient end product, the unavoidable requirement is that the filtering slot and the back groove are machined from different sides of the plate. This in turn requires that either the slot or the groove must be made precisely, with the accuracy of tenths of a millimeter, in the correct place to produce an aperture of the correct configuration. In practice this is not possible, or at least economically possible. Thus the publication has remained as a sole attempt without any real industrial applications.

As can be seen from the above, the following drawbacks are typical of the manufacture of most of the prior art screen plates:

many work phases;
  a) machining the back groove
  b) machining the screen aperture, and
  c) removal of burrs the rheologically unfavourable configuration of the flow opening of which it is characteristic that it is formed of a screening small aperture and of a wider portion allowing a more free flow therethrough;

a back groove/recess collecting sticky substances;

a limited open area which depends more on the dimensioning of the back grooves/recesses than on the dimensioning of the screening aperture itself;

heat stresses by some manufacturing methods;

in most cases an aperture located perpendicular to the plate.

It is possible with the present invention to eliminate the drawbacks described above of the prior art solutions and at the same time the configuration and the direction of the screen aperture can be optimized so that the aperture causes as little flow resistance as possible with the result that the capacity of both each of the openings and the entire screen plate substantially increases compared to prior art solutions. Further, the machining of the screening apertures can be carried out as one single work phase bacause the back groove and the after treatment is not necessarily needed.

Also, the manufacturing method according to the invention provides a possibility to produce apertures and slots with a free geometric configuration, or different combinations of these, the manufacture of which is at the present very difficult, practically impossible. It must also be noted that the cross sectional axis of the aperture or the slot need not be perpendicular to the plate to be cut.

It is characteristic of a preferred embodiment of the method of the present invention that it employs waterjet cutting in the manufacture of the screen products.

Until now the waterjet cutting mentioned above has been used mainly in the aircraft industry. Its use is relatively common in the food, plywood and plastics industry where the product to be cut varies from ice cream to dashboards of cars. It has also been used to some extent in the cutting of the printed circuit boards used in the electronic industry.

However, it must be stated that the use of a waterjet particularly in cutting applications is rapidly expanding and new areas of application are found for it all the time. These are for example the cutting of materials, which are by other methods difficult to cut, so that a piece of a desired form is cut from a plate. However, up to our invention, the waterjet cutting has been used to create a rectangular cut, in other words it has always been strived for an as straight slot as possible, with a rectangular cross section. All the studies and the development of the apparatus and its operation parameters have until now had as the goal to maximize the outcome of the cut, i.e. to produce rectangular cutting edges.

In an ordinary waterjet cutting, the pressure of clean filtered water is raised to approx. 1400–4500 bar and the water is supplied in a stainless steel piping to a nozzle, made of artificial sapphire and having a hole diameter of 0.1–0.6 mm so as to create a jet velocity of 600–2000 m/s. The water consumption of this kind of an apparatus is approx. 0.5–10 liters per minute. The distance of the nozzle from the workpiece is usually about 0.2–25 mm; however, the distances of 5–20 mm are the most recommendable. The nozzle is usually controlled by a robot or a corresponding means but small workpieces can be taken care of also manually.

Waterjet cutting can by used in the cutting of almost any conceivable material from paper, fabrics, plywood to composites, multilayered materials, ceramics and different hard metals. Also the food industry has found good applications for the waterjet cutting. In case of soft materials, only water is used as the cutting substance. When cutting metal and other hard materials, abrasive particles, such as granite, aluminium oxide, silicon nitride, olivine or other like material, is added to the water. In this case, about 90% of the cutting is considered to be effected by the abrasive substance and only 10% by the water.

It is charactristic of the method of our invention that apertures widening steplessly are machined in the plate material in one work phase and that the surface of the plate facing the material to be treated is provided with grooves in the bottom area of which said apertures open.

It is characteristic of the screen product of our invention that the apertures widening steplessly in the direction of the flow through the screen are located in the bottom area of the grooves provided in the surface of the plate.

It is characteristic of the use of the screen product according to our invention that the ratio of the cleanliness and the capacity of the screening operation is optimized by changing the angle of inclination of said apertures.

The invention is described below more in detail with reference to the accompanying drawings of which

BRIEF DESCRIPTION OF THE DRAWINGS

FIGS. 5a–h illustrate different aperture configurations attainable by waterjet cutting;

FIGS. 6a and b illustrate different cross section configurations of slots and apertures;

FIGS. 7a and b illustrate two most preferred embodiments of the invention;

DETAILED DESCRIPTION OF THE DRAWINGS

Figure 1:
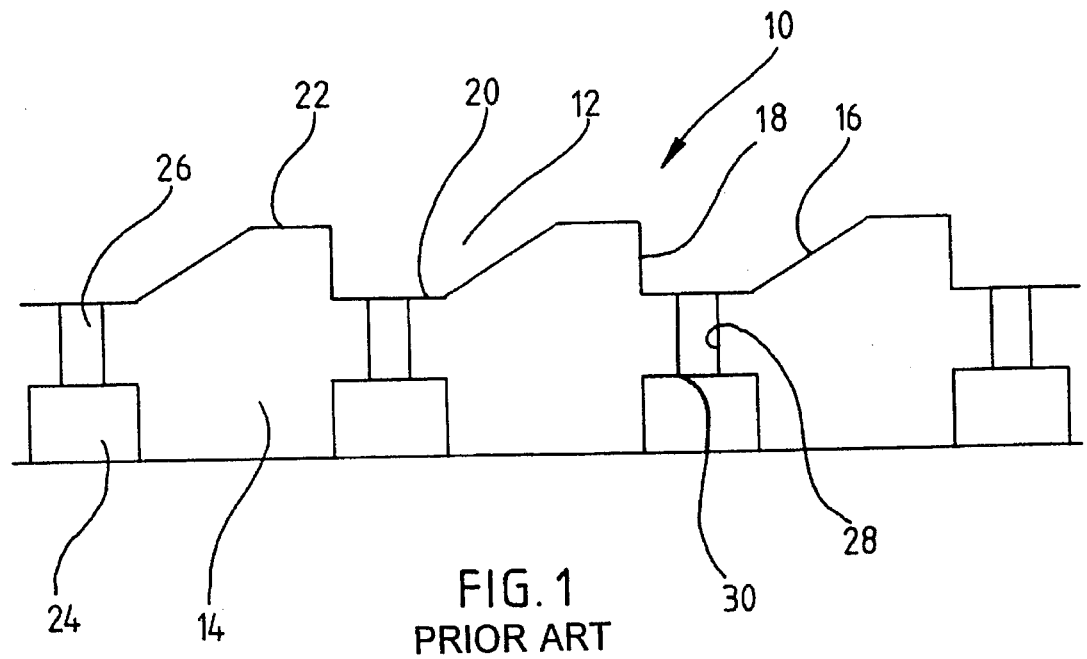
FIG. 1 illustrates in a schematic section a prior art screen product manufactured by mechanical machining.

FIG. 1 illustrates a conventional PROFILE™ screen plate 10 developed by A. AHLSTROM CORPORATION and manufactured by milling or drilling in three phases:

a groove 12 is milled in a plate 14 by the pulp inlet side, the groove comprising at least an inclined side surface 16 and a substantially perpendicular side surface 18 (a substantially perpendicular side surface means a surface the deviation of which from the perpendicular in either direction is at the most about 5–10 degrees); further, the structure of the figure comprises a bottom surface 20 of the groove and an upper surface 22 connecting the side surfaces of adjacent grooves; it can be spoken generally about the bottom region of the groove as in practice it does not matter whether the groove has a bottom surface 20 or only a portion connecting the side surface 16 and 18 and rounded for the machining requirements;

a back groove 24 is milled in the plate 14 at the pulp outlet side; and a narrow slot/aperture 26 is milled/drilled the depth of which should be as small as possible in order to reduce the flow resistance. The depth of the slot/aperture 26 is naturally determined by the distance between the bottoms of the groove 12 and the back groove 24 which distance cannot be reduced too much without the strength of the plate being thereby impaired. The apertures 26 are machined in the direction of their flow, i.e. starting from the groove 12. The produced screening aperture 26 has thus a straight configuration and, when the aperture is a slot, the machining scratches (the small ridges mentioned previously) in the wall 28 of it are transverse in relation to the flow. The third machining phase (the machining of the slot/hole) produces burr 30 at the pulp outlet side at the bottom of the back groove 24 which burr collects fibers if it is not removed. Usually, the removal is realized, or rather, it is attempted to be realized, by polishing the plate electrolytically which again adds a new work phase to the manufacture of the plate. However, all the burrs cannot be removed by this method and the screen plate industry all around the world is looking for new methods of efficiently removing the burrs from the bottoms of narrow slots.

Figure 2:
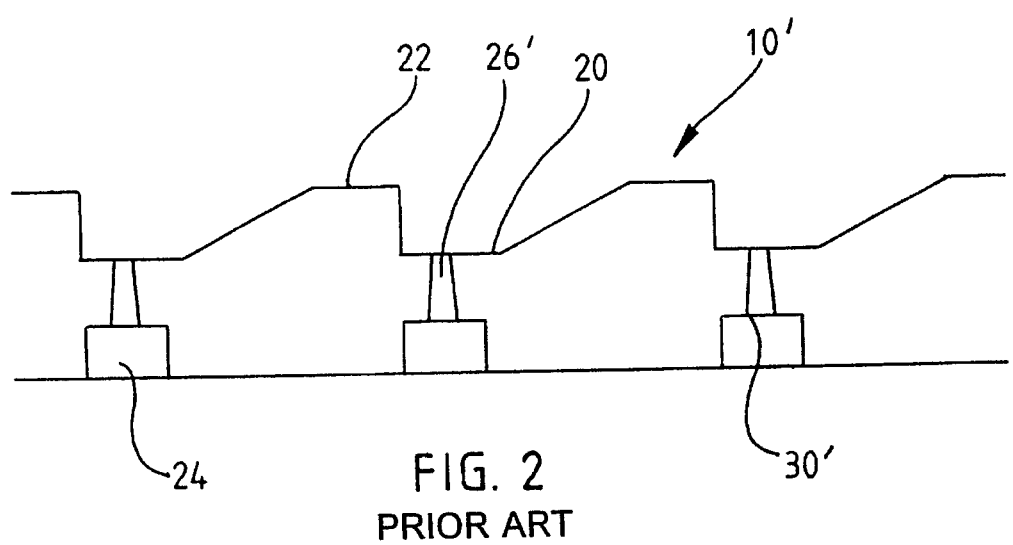
FIG. 2 illustrates in a schematic section a prior art screen product manufactured by laser machining.

FIG. 2 illustrates a laser machined plate 10' the work phases of which are the same except that the third phase is carried out by means of a laser. The produced slot 26' is either quite straight or a little opening in the direction of the beam with an angle of 0–2 degrees. A laser beam creates a burr in the outlet edge whereby the direction of the laser beam is of course the same as the direction of the flow. As already stated above, also the burr 30' produced by the laser must be removed which in turn is not a simple procedure because of the mechanism that produced it which gives the burr a greater strength than the basic material has.

Figure 3:
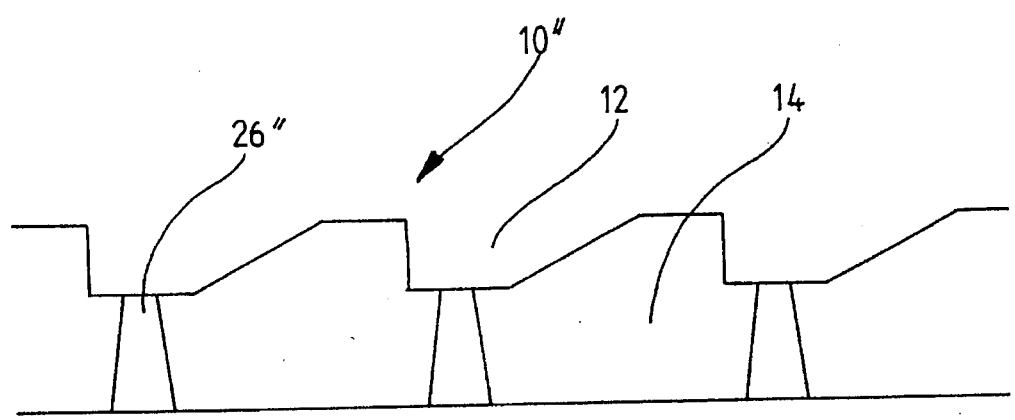
FIG. 3 illustrates in a schematic section a screen product manufactured by the method of the invention.

FIG. 3 illustrates a screen plate 10" manufactured according to the method of the invention, i.e. by using waterjet cutting, and more specifically a slot or an aperture 26" produced in it by means of the waterjet cutting. Unlike the previous manufacturing methods, the method according to the invention has two work phases, only. In other words, the slot 12 is first machined in the pulp inlet side of the plate 14 and immediately thereafter the entire slot/aperture 26". As illustrated in the figure, the slot/aperture 26" opens in the direction of the pulp flow and has an opening angle of between 4–8 degrees whereby the achieved configuration is rheologically very favourable. Further, it must be noted that the inlet and outlet edges of the slot/aperture 26" are free from burrs. The machining direction of the slot/aperture 26" is adverse to the flow direction, in other words the machining is started from the smooth side of the plate and the slot/aperture 26" opens in the groove 12. If the aperture is machined in a smooth plate it can be stated generally that the machining of the aperture is started from that side of the screen plate-to-be to which the accepted material flows through the plate. As the slot or the aperture is created mainly by abrading the surface is smooth. If desired, two regions can be seen in the produced aperture as also in the screen plates manufactured earlier by other methods, in other words a small screening aperture, the so-called first portion, and a so-called second portion allowing a freer passage of flow. However, the distinct difference between our invention and the previously known methods is that the screening opening of our invention is manufactured in one single work phase, i.e. both the first and the second portion of the opening are machined at the same time. In the first portion, the wall of the aperture is relatively straight having an opening angle of the order of about 2 degrees, and in the second portion the opening angle increases from said about two degrees to 4–10 degrees depending naturally for example on the thickness of the plate and the minimum diameter/width of the aperture to be machined. Further, it is characteristic of the manufacturing method of our invention that the so-called outlet angle of the accepted pulp is remarkably rounded which results in a form of the aperture which is very advantageous in view of the flow resistance. When comparing the use of the waterjet with conventional cutting it can be said, that in cutting the screen plate apertures, among other things a higher liquid feed velocity, a higher cutting velocity are employed and the nozzle itself is kept further away from the surface of the plate to be cut. In other words, the cutting of the slots is carried out in a way which is condemned in articles and instructions on waterjet cutting as being faulty. By this procedure, even very thick plates can be cut with a waterjet whereby the size of the aperture at the supply side of the liquid is relatively large but tapers to be very small at the discharge side of the liquid. This applies particularly when an abrasive is used whereby the abrasive particles are ground to a fine powder at the "beginning portion" of the plate and abrade only a very narrow slot or a very small aperture at the discharge side. Thereby a minimum slot width of 0.1 mm is achieved, which is the smallest size of a screen plate slot employable in the wood processing industry, and when using apertures, also a size of 0.6 mm or larger is attainable. Naturally, also larger slots and apertures can be manufactured by waterjet cutting but the opening sizes mentioned above cannot be produced by other manufacturing methods. Due to the method of the invention it is also possible to manufacture screen plates or screen cylinders of materials other than the conventional steel, such as composites, for example a fiber glass composite, ceramics, duplex steel or other material suitable for the purpose required. Naturally the waterjet cutting can quite as well be carried out in a drum already bent and/or formed cylindrical.

Figure 4:
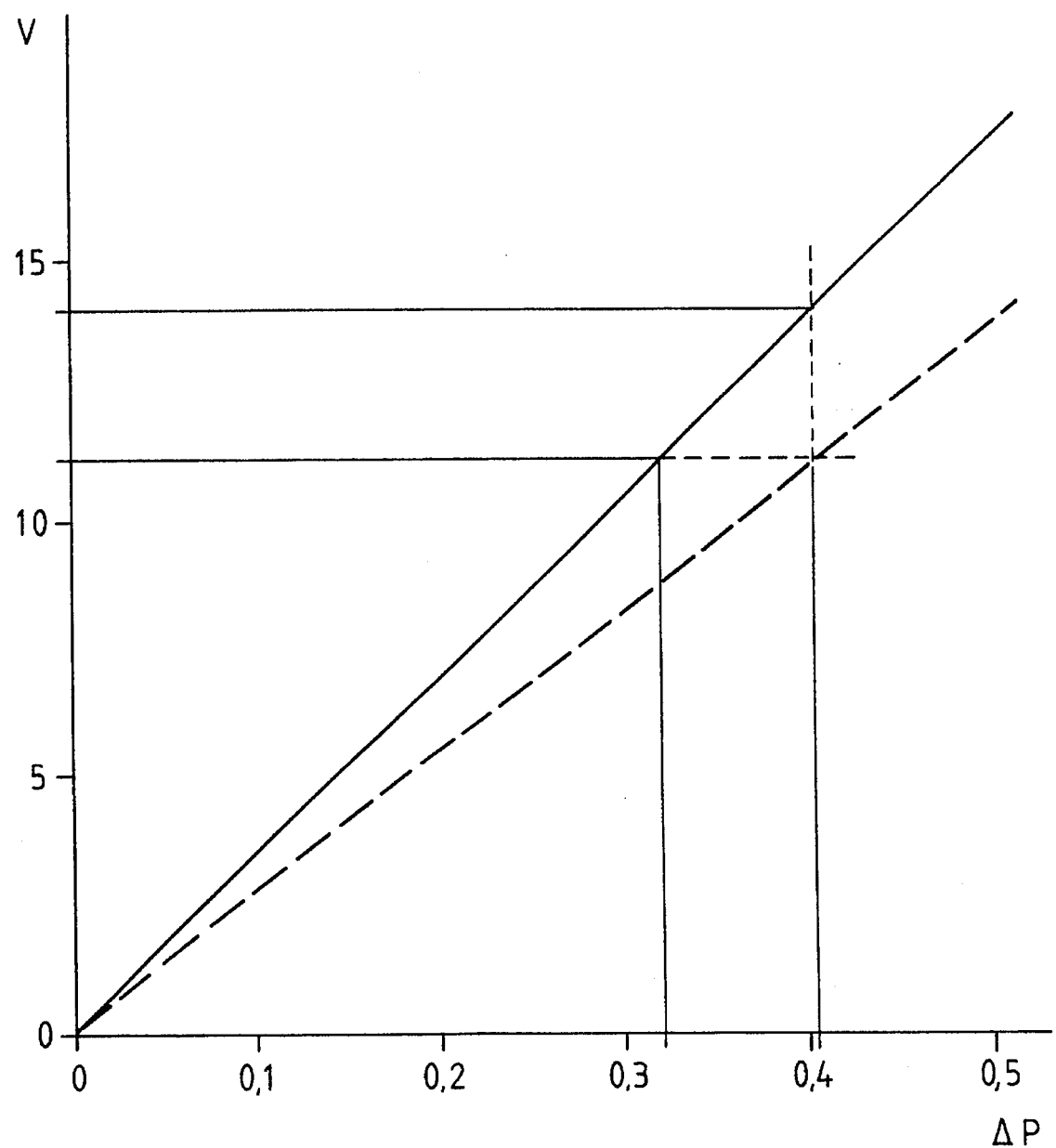
FIG. 4 illustrates the velocities of water at different aperture configurations.

FIG. 4 illustrates real comparable flow rates in slots manufactured by milling and waterjet cutting. Simple measurement could indicate the flow resistance in the slots machined by different manufacturing methods. The measurement was carried out by machining by both methods apertures of equal size (the inlet side width+the length of the slot) in the bottom of a cylindrical vessel, the thickness of which bottom was 6 mm, so that the depth of the narrow groove in the milled plate was 2 mm the depth of the back groove 4 mm, and the waterjet cutting was carried out in one phase straight through the 6 mm thick plate; and by measuring the flow rates at different pressure differences. The pressure differences were created by controlling the level of liquid in the cylinder. The difference in the flow rates indicates the advantages achievable by the method of the invention in screening; with the same capacity, i.e. flow rate, the pressure difference created by the screening device of the invention is only 80% of that of a conventional screening device which improves the operation of the screen and causes a corresponding improvement in the purity of the screened pulp. On the other hand, by keeping the pressure difference constant the capacity of a slot can be improved by more than 25% compared to the old solution.

FIG. 5 illustrates different geometrical forms of slots to be manufactured by the method of the invention. It can be said that only the imagination of the designer limits the alternatives. In addition to different curved and wavy forms also different combinations of holes and slots can be created by waterjet cutting. The holes and the slots can be connected one after the other or side by side, or enlarged portions may be arranged in the slots with appropriate spacing which increases the open area of the plate remarkably in comparision with a conventional aperture plate. Already the slots alone increase the open area but also the holes can be located close to each other if they are interconnected by a narrow slot (FIG. 5f) as thereby there is no danger of the clasp phenomenon where the opposite ends of a fiber penetrate into adjacent apertures and the fiber sticks to the plate. In this embodiment, the fiber penetrated into two adjacent apertures can slip via the slot through the plate.

FIG. 6 illustrates different cross section forms of slots connection with a PROFILE™ plate which slots can be also inclined as illustrated in the figure. FIG. 6a illustrates a straight aperture cut in the center of the bottom surface of a PROFILE™ plate so that also the progressively opening form of the aperture can be seen. FIG. 6b illustrates an aperture machined in a corresponding way in the center of the bottom surface in a non-perpendicular position in relation to the surface of the plate. The inclination (angle $\alpha$) of the hole or the slot has a certain influence on the obtainable capacity and purity. As to the flow direction on the surface of the plate in relation to the aperture, it can be said that any flow direction is possible. When the so-called PROFILE™ plate mentioned above is in question it is in some cases, as can be seen from the following description, advantageous to arrange the inclination $\alpha$ of the screening aperture so that it starts substantially at the root of the vertical side surface of the groove and is directed under the ridge between the grooves. Previous manufacturing methods have allowed only screening holes/slots which are prependicular to the plate.

Figure 8A:
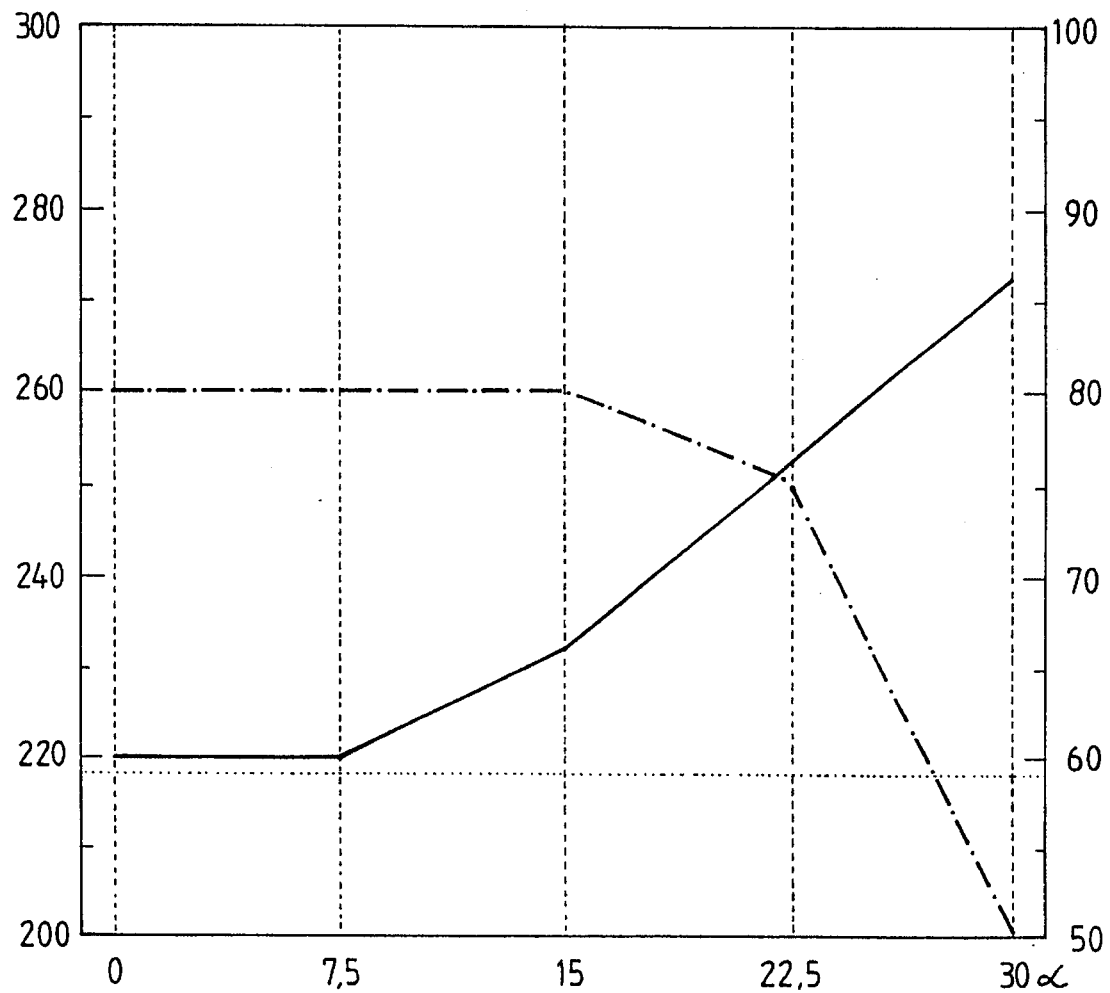
FIGS. 8a and b illustrate the purification efficiencies and capacities attainable with the plates in FIGS. 7a and b, as a function of the inclination of the aperture.
Figure 8B:
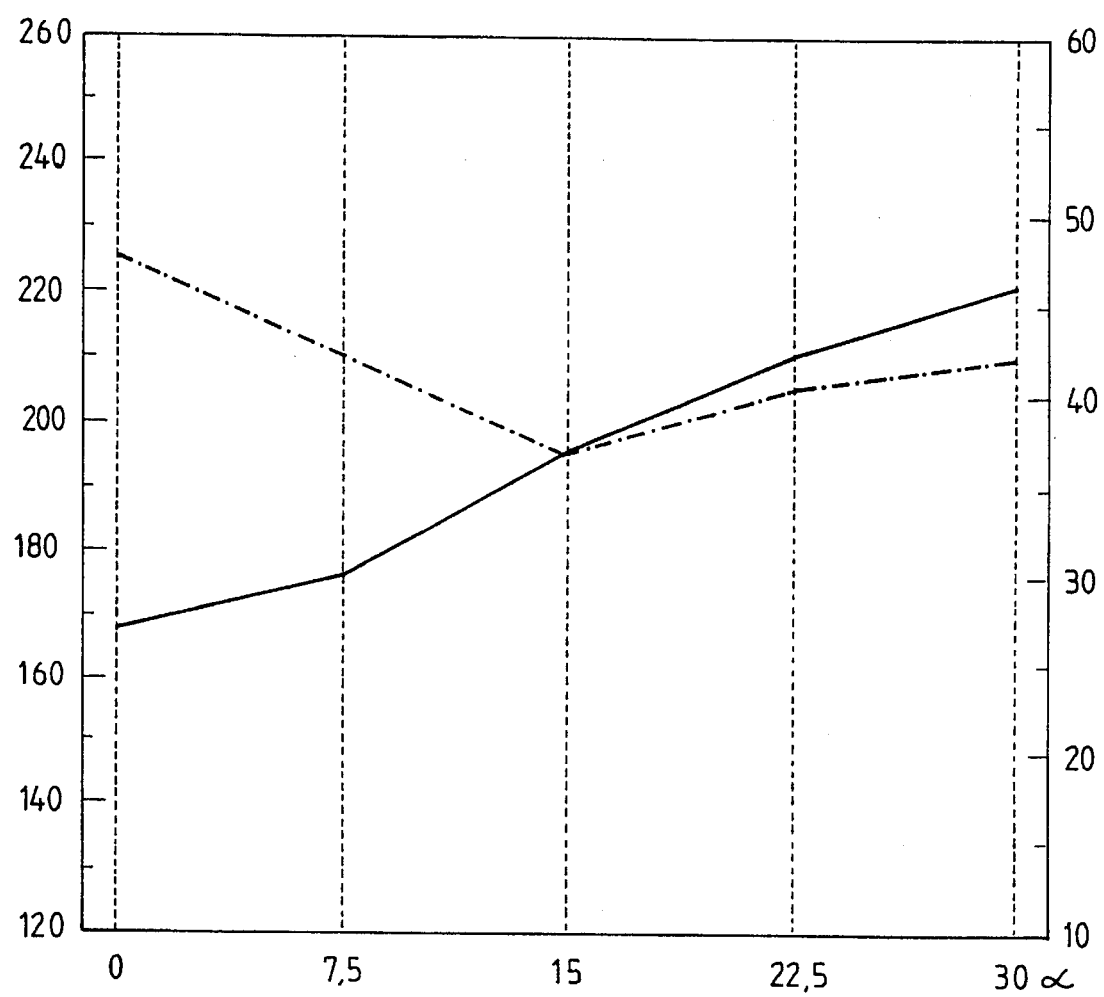

FIG. 7a illustrates a PROFILE™ screen plate 110 and a screening aperture 126, i.e. a slot or a hole, machined at the root of a substantially perpendicular side surface 118 of a groove 112 of the plate. The aperture 126 is located quite at the root of said side 118 and is perpendicular to the surface of the plate. As can be seen in FIG. 8b, a great purifying efficiency can be reached by this kind of a slot construction when screening practically speaking almost any kind of stock but the capacity remains relatively low.

FIG. 7b illustrates a PROFILE™ plate 110 in which the screening aperture 126' is located quite corresponding to the previous embodiment at the root of the substantially vertical side surface 118 but is directed under the ridge defined by the side surface 118. FIGS. 8a and b illustrate the purifying efficiency and the capacity obtainable for two different pulps, OCC (recycled corrugated cardboard) and TMP (thermomechanical pulp) as a function of the inclination angle $\alpha$. FIG. 8a indicates that with OCC, because the fibers are more bendable (the rigidity of OCC is $10^{-12}$ N/m$^2$, that of TMP $10^{-10}$ N/m$^2$), the capacity (illustrated by the dotted line with the left vertical axis as the scale, unit adtm/m$^2$) begins to drop relatively steeply when the inclination $\alpha$ of the aperture increases to exceed 15 degrees. When considering both the capacity and the cleaning efficiency (illustrated with a continuous line, the right vertical axis with % as the unit) the optimal operation range is between 7.5 and 22.5 degrees. It is seen from FIG. 8b that with TMP the inclination of the aperture does not seem to have any remarkable effect on the capacity but the cleaning efficiency increases when the inclination $\alpha$ of the aperture increases. The optimal range can be said to be with aperture inclinations of more than 7.5 degrees.

However, even if the increase in the inclination of the aperture seems to improve both the purity and the capacity with TMP, the limits set by the manufacture of the plate limit the inclination of the aperture to a maximum of approx. 30 degrees. In practice, the manufacturing technique and also the length/diameter ratio (flow resistance) of the aperture probably limit the inclination angle further a little smaller; thus a maximum inclination of 22.5–25 degrees could be considered as a basis.

As can be seen from the above description, a manufacturing method has been developed by which a screen plate can be manufactured which is optimal in view of the requirements of each pulp to be screened. Test runs can used to determine the optimum inclination angle of the screening aperture for either the capacity or the purity alone, or an overal optimum angle can be chosen. Until now, this far advanced methods of optimizing a screen plate have not been used in the wood processing industry but the height of the profile (depth of the groove) and the diameter/width of the screening aperture have been chosen on the basis of experience while the aperture has always been perpendicular to the surface of the plate. However, when studying the results illustrated in FIGS. 8a and 8b, it is learned that for example with OCC the cleaning efficiency can be raised from 60 to 75% while the capacity decreases from 260 to 250 admt/m$^2$ when the inclination of the screening aperture is increased from the conventional 0 degrees to 22.5 degrees. In other words, the cleaning efficiency improves by a quarter while the capacity reduces by approx. four per cent.

Correspondingly, with TMP, the cleaning efficiency can be increased from about 27% to 46% while the capacity decreases from 225 to 210 when the inclination of the aperture inceases from the conventional 0 degrees to 30 degrees. In other words, the cleaning efficiency increases by approx. 70% while the capacity decreases only by about 7 per cent.

Figure 9:
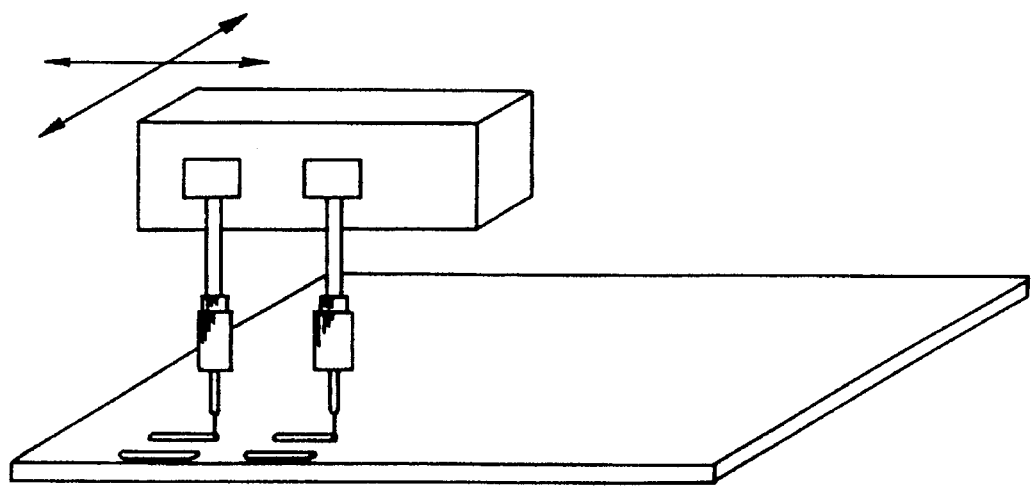
FIG. 9 illustrates schematically waterjet cutting of a flat plate.
Figure 10:
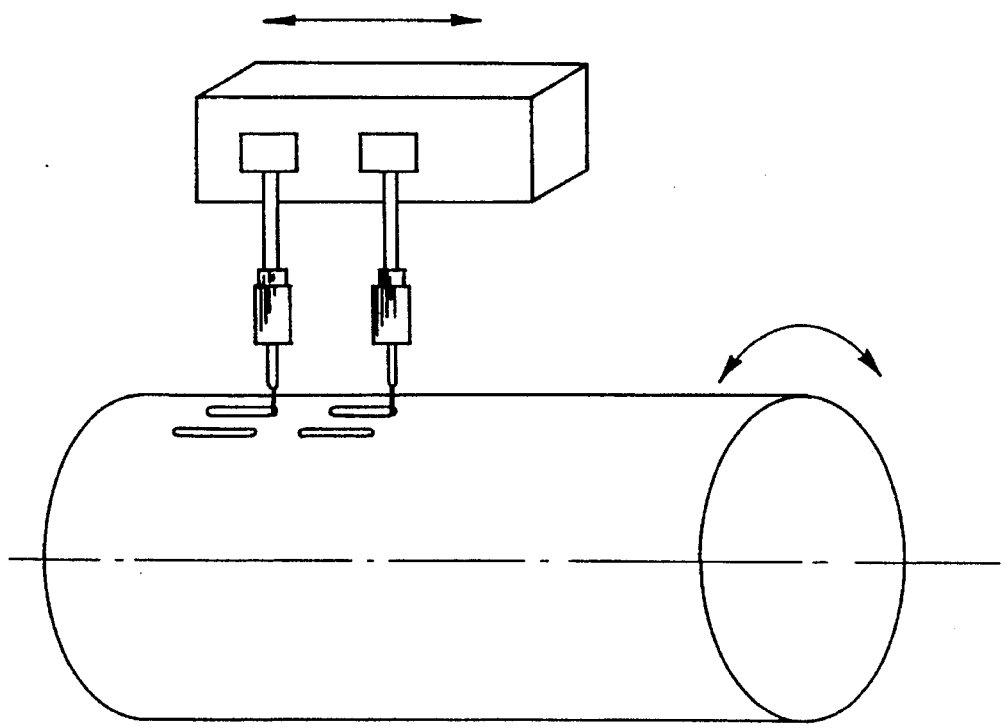
FIG. 10 illustrates schematically waterjet cutting of a cylindrical piece.

When thinking about the manufacture, the method of the invention also allows more freedom in particular in the manufacture of cylindrical products. FIG. 9 illustrates the cutting of a flat plate by a conventional method, according to which several parallel slots are cut simultaneously in the plate and in which the cutting head moves in two directions. The method of the invention can be applied in the way illustrated in FIG. 9 and also in the way illustrated in FIG. 10 in the cutting of a cylindrical piece whereby the machining head moves in the direction of the axis of the cylinder and the cylinder is rotated. If the cylinder is rotated during the machining operation, slots are produced which are inclined in relation to the cylinder axis.

Figure 11A:
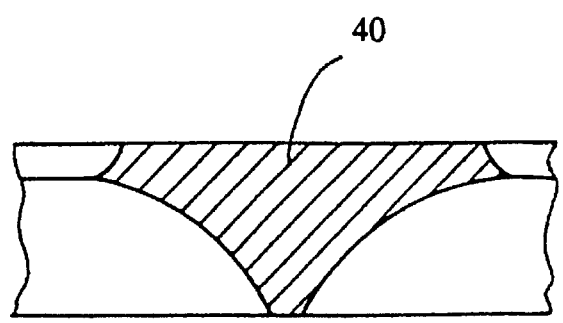
FIGS. 11a and 11b illustrate two different embodiments in which the size and the form of the necks between subsequent apertures, determined by the strength requirement.
Figure 11B:
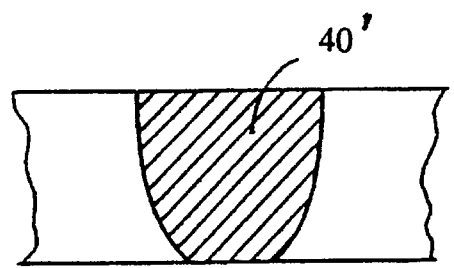

The non-cut portions required for the strength of the plate are reduced to about 70% of the conventional, as indicated by FIG. 11a illustrating a conventional milled slotted cylinder and more closely a neck 40 between two subsequent slots, and by FIG. 11b illustrating a corresponding neck 40' produced by the method of the invention. This adds the area of the screening apertures, i.e. the open area of the screen, by about ten per cent. As is seen from the figure, the neck 40' according to FIG. 11b is substantially rectangular. The ends of the slots form with the direction parallel with the surface perpendicular to the surface of the plate an angle which in its maximum is only about 5 to 10 degrees. This kind of an increase in the open area results in a corresponding increase in the capacity of the device.

Even if mainly the so-called PROFILE™ screen plate has been discussed both in the text and in the figures, the plate can naturally be either provided with grooves of other configuration, or the grooves, or rather the ridges between the grooves, may have been replaced by ribs or corresponding upstanding members secured to the surface of a smooth plate. For example, see the ribs 40 which have been secured to the first surface 41 of the screen plate 114, opposite the second surface 42 from which the aperture 126 has been formed. Thus it is possible that the groove comprises at least two inclined side surfaces, at least one inclined and one substantially perpendicular side surface, or at least two substantially perpendicular side surfaces. Also the screening apertures can be located either in the bottom of the grooves, in the sides of the grooves or extend partly in both of these. Further, it is naturally possible that the there is one or several subsequent slots or rows of holes in each groove.

Further, it should be noted that our invention is not limited to the use of the waterjet cutting but, on the other hand, the scope of protection of the invention covers also all the screen plates and cylinders, the screening aperture of which is formed rheologically in a correct way to have the form defined above in the description of our invention and particularly in the patent claims.

Especially it must be noted that the method of our invention can be employed to manufacture flat, drum, cylinder, disc or conical screening units for the most various screening purposes in any industry, in which screening units the screening members are small apertures having the form of a slot or a hole. The pulp and paper industry and the cylindrical screens commonly used there are discussed here as one of the most common applications. Further, it must be noted, that the screen according to the invention can be used, in addition to screening, also in removal of liquid, in thickening and other purposes of that kind.

We claim:

1. A method of producing a screen cylinder or plate from a piece of material having first and second opposed substantially parallel faces, comprising the steps of:
   (a) forming a plurality of grooves associated with the first face, each groove having a lowermost portion closest to the second face; and
   (b) from the second face, in a single working phase, forming stepless, continuous surface through-extending apertures in the material, the apertures cooperating with the grooves.

2. A method as recited in claim 1 wherein step (b) is practiced by waterjet cutting and is practiced to produce apertures having varying cross-sectional area, the largest cross-sectional area adjacent the second face and the smallest at the lowermost portion of a groove.

3. A method as recited in claim 2 wherein step (a) is practiced by machining the grooves into the first face of the piece of material.

4. A method as recited in claim 3 wherein step (a) is practiced before step (b).

5. A method as recited in claim 4 wherein water jet cutting is performed using a water jet cutting head; and wherein the piece of material is in the form of a cylinder, and wherein each individual aperture is formed by rotating the screen cylinder into alignment with a water jet cutting head.

6. A method as recited in claim 3 wherein step (b) is practiced before step (a).

7. A method as recited in claim 2 wherein step (a) is practiced by securing upstanding members to the first face of the piece of material, the first face comprising the lowermost portion of the grooves.

8. A method as recited in claim 2 wherein each aperture has an axis; and wherein step (b) is practiced to form the apertures so that the axes thereof are non-perpendicular to the second face.

9. A method as recited in claim 2 wherein step (b) is practiced to produce slots as the apertures.

10. A method as recited in claim 2 wherein step (b) is practiced to produce substantially round cross-section openings as the apertures.

11. A method as recited in claim 1 wherein step (a) is practiced by machining the grooves into the first face of the piece of material.

12. A method as recited in claim 11 wherein step (a) is practiced before step (b).

13. A method as recited in claim 1 wherein step (a) is practiced to form a first groove surface which is substantially perpendicular to the first face, and a second groove surface which is inclined with respect to the first face, and wherein steps (a) and (b) are practiced so that an aperture opens up into each groove adjacent the first groove surface.

14. A method as recited in claim 1 wherein each aperture has an axis; and wherein step (b) is practiced so as to form each aperture axis substantially perpendicular to the second face.

15. A method as recited in claim 1 wherein step (a) is practiced by securing upstanding members to the first face of the piece of material, the first face comprising the lowermost portion of the grooves.

16. A screen cylinder or plate comprising:

a piece of screen material having non-intersecting first and second faces;

a plurality of grooves associated with the first face, each groove having a lowermost portion closest to the second face; and a plurality of apertures opening up into the grooves, each aperture being stepless and extending from the second face to the lowermost portion of a groove.

17. A screen cylinder or plate as recited in claim 16 wherein each aperture has a varying cross-sectional area, the largest cross-sectional area adjacent the second face, and the smallest at the lowermost portion of a groove.

18. A screen cylinder or plate as recited in claim 17 wherein said grooves are formed in said first face.

19. A screen cylinder or plate as recited in claim 18 wherein each groove includes a first groove surface substantially perpendicular to said first face, and an inclined second groove surface inclined to said first groove surface, an aperture opening up into said groove adjacent said first groove surface.

20. A screen cylinder or plate as recited in claim 17 wherein said groove lowermost portion is said first face, each groove formed by elements connected to and upstanding from said first face.

21. A screen cylinder or plate as recited in claim 17 wherein said apertures are slots.

22. A screen cylinder or plate as recited in claim 17 wherein said apertures are substantially circular cross-section holes, and wherein said piece of material is in the form of a screen cylinder.

23. A screen cylinder or plate as recited in claim 17 wherein each aperture has an axis, wherein each groove has a ridge adjacent the groove, and wherein the aperture axes are non-perpendicular to the second face.

24. A screen cylinder or plate as recited in claim 23 wherein the largest cross-sectional area portion of each aperture is under a groove ridge.

25. A screen cylinder or plate as recited in claim 23 wherein said axis of said aperture makes an angle of inclination of between about 7.5–22.5 degrees with respect to said first face.

26. A screen cylinder or plate as recited in claim 16 wherein each aperture has an axis, and wherein the aperture axes are substantially perpendicular to the second face.

27. A screen cylinder or plate as recited in claim 16 wherein said piece of screen material is ceramic.

28. A screen cylinder or plate as recited in claim 16 wherein said piece of screen material is duplex steel.

29. A screen cylinder or plate as recited in claim 16 wherein said apertures are slots, and wherein said piece of material is in the form of a screen cylinder.

30. A screen cylinder or plate as recited in claim 16 wherein said apertures are substantially circular cross-section holes.

* * * * *